(12) United States Patent
Prickel et al.

(10) Patent No.: US 9,114,822 B2
(45) Date of Patent: Aug. 25, 2015

(54) METHOD FOR AUTOMATIC HEADLAND TURN CORRECTION OF FARM IMPLEMENT STEERED BY IMPLEMENT STEERING SYSTEM

(75) Inventors: Marvin Prickel, Homer Glen, IL (US); Paul Weisberg, Saskatoon (CA); Marc St-Jean, Saskatoon (CA); Shane Durant, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 787 days.

(21) Appl. No.: 13/005,629

(22) Filed: Jan. 13, 2011

(65) Prior Publication Data

US 2012/0185139 A1 Jul. 19, 2012

(51) Int. Cl.
*B62D 6/02* (2006.01)
*A01B 69/00* (2006.01)
*B62D 13/00* (2006.01)

(52) U.S. Cl.
CPC .............. *B62D 6/02* (2013.01); *A01B 69/004* (2013.01); *B62D 13/00* (2013.01)

(58) Field of Classification Search
CPC .. A01B 69/003; A01B 69/004; A01B 69/006; B62D 13/00; B62D 1/00; B62D 5/00; B62D 6/00
USPC .......................................................... 701/50
See application file for complete search history.

(56) References Cited

U.S. PATENT DOCUMENTS

| | | | |
|---|---|---|---|
| 4,463,811 A | 8/1984 | Winter | |
| 4,802,545 A * | 2/1989 | Nystuen et al. | 180/419 |
| 5,329,451 A | 7/1994 | Notsu | |
| 5,904,365 A | 5/1999 | Dillon | |
| 6,131,691 A | 10/2000 | Morch | |
| 6,494,476 B2 | 12/2002 | Masters et al. | |
| 6,688,403 B2 * | 2/2004 | Bernhardt et al. | 172/2 |
| 6,865,465 B2 | 3/2005 | McClure | |
| 7,147,241 B2 | 12/2006 | Beaujot et al. | |
| 7,383,114 B1 | 6/2008 | Lange et al. | |
| 7,412,315 B2 | 8/2008 | Wildey et al. | |
| 7,623,952 B2 | 11/2009 | Unruh et al. | |
| 2005/0015189 A1 | 1/2005 | Posselius et al. | |
| 2008/0004778 A1 * | 1/2008 | Rekow | 701/50 |
| 2008/0257570 A1 * | 10/2008 | Keplinger et al. | 172/9 |
| 2009/0032273 A1 * | 2/2009 | Hahn | 172/2 |
| 2009/0236825 A1 | 9/2009 | Okuda et al. | |
| 2010/0256871 A1 * | 10/2010 | Mitchell | 701/42 |
| 2012/0253625 A1 * | 10/2012 | Canuto et al. | 701/72 |

* cited by examiner

*Primary Examiner* — Fadey Jabr
*Assistant Examiner* — Basil T Jos
(74) *Attorney, Agent, or Firm* — Rebecca L. Henkel

(57) ABSTRACT

A method for disabling the implement steering system of a towed implement includes monitoring the axle of a steerable axle of the towed implement and therefrom, determining if the implement is making a headland turn. The method further includes automatically centering the implement following a headland turn.

20 Claims, 8 Drawing Sheets

METHOD FOR AUTOMATIC HEADLAND TURN CORRECTION OF FARM IMPLEMENT STEERED BY IMPLEMENT STEERING SYSTEM

BACKGROUND AND SUMMARY OF THE INVENTION

The present invention is generally directed to steering of a farm implement and, more particularly, to a method for controlling an implement steering system.

Many tillage, seeding, and planting equipment are designed to be drawn behind tractors and the like. Most of these towed devices are steered primarily by the tractor and do not have their own steering mechanisms.

Increasingly however, farm implements and other towed devices are being equipped with steering systems that allow the towed device to steer independent of the towing device, e.g., tractor. Seeding implements, for example, equipped with implement steering systems, allow the seeding implement to remain aligned with the tractor at all times during seeding in order to obtain straight and even seed rows. However, when the tractor is traversing in a direction perpendicular to the slope of the land, the implement steering system allows the seeding implement to move independently of the tractor to avoid the implement from "side slipping" or moving in the direction of the slope thereby falling out of alignment with the tractor. In this regard, the implement steering system provides for consistent row spacing.

Another circumstance when it is desirable to have an independently steerable implement is when the tractor must maneuver the implement around an obstruction such as a slough, telephone pole, large boulder and the like. If the towed implement does not have independent steering, the tow vehicle must make a wider turn which will result in a tendency for the towed implement to "cut corners" thereby, in the case of a seeding implement, the seed openers are more apt to twist instead of travel straight ahead, which is the intended use.

Thus, a towed implement having independent steering would be able to steer itself back into alignment with the tractor and minimize the towed vehicle's arc of travel. This can be accomplished by equipping the towed implements with at least one steerable surface engaging wheel, and more preferably, with two steerable surface engaging wheels integrated as part of the main frame of the towed implement. Steering can either be automatically controlled by means of a steering angle sensor, global positioning sensor (GPS) or could be operator controlled.

One of the drawbacks of conventional implement steering systems is that the system, once activated, remains activated until it is manually deactivated. This can be problematic if the implement steering system is engaged when conditions are not well-suited for auto-steering. For example, most implement steering systems are designed for use at lower speeds, such as the speeds during field operation. When the implement is being transported, which is typically done at higher travel speeds, conventional implement steering systems do not have the response time that is necessary to make timely corrections to the implement's position, thus are typically disabled.

The present invention provides an implement steering system that self-disables if a high travel speed is detected. Once the implement has returned to a safe auto-steering speed, the implement steering system is automatically enabled. In this regard, the invention does not require manual shut-off of the implement steering system at higher travel speeds. Similarly, the invention does not require an operator to manually enable the implement steering system when safe operating speeds are obtained.

The present invention also provides for auto-centering of the steering system when in transport. As implements become larger, navigation around turns becomes increasingly difficult. Having an independent steering system provides needed assistance for negotiating turns. This also requires drives attention when negotiating back out of the turn. In some cases this leads to driver distraction. The present invention provides an auto-center feature that allows the steering system to self-align when a target ground speed is detected in the event the operator becomes distracted with forward operation.

The implement steering system of the invention is designed to remain relatively quiet when the implement is being towed during in-field use, i.e., during active seeding. Although relatively quiet as the implement is being towed along rows, the implement steering system of the present invention is designed to independently auto-center the steering system of the implement at headland turns to correct for field impacts, internal leaks, thermal changes and other conditions that may have caused misalignment of the implement. In this regard, the implement steering system has a self-centering feature that is active during headland turns and at other turning instances.

In addition to accounting for unsafe auto-steering conditions, the present invention also provides an implement steering system that is selectively enabled and disabled based on the mode of operation of the implement.

It is an object of the invention to provide an implement steering system that is disabled automatically at higher transport speeds.

It is also object of the invention to provide an implement steering system that automatically centers itself relative to the defined calibration value at headland turns of the towing vehicle.

It is another object of the invention to provide an implement steering system that automatically disables itself if a steering angle of the implement is outside an acceptable range of values.

It is yet a further object of the invention to provide audio and/or visual indications to an operator conveying the status of the implement steering system for the implement.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS
(ADD UPDATED FIGURES)

Preferred exemplary embodiments of the invention are illustrated in the accompanying drawings in which like reference numerals represent like parts throughout.

In the drawings.

DETAILED DESCRIPTION

The present invention with be described with respect to an implement steering system and, more particularly, to a set of control processes for software based control of the implement steering system of a farm implement, such as front folding planter. An exemplary front folding planter is described in U.S. Pat. No. 7,469,648, the disclosure of which is incorporated herein by reference. The present invention is also applicable for software control of the implement steering systems of other towed devices, such as a hay wagon, seeders, tillage implements, trailers, transport trailers, work trailers, flat beds, freight trailers, and the like. Moreover, while the invention will be described with respect to a method of controlling an implement steering system, it will be appreciated that the method can be embodied in a computer program, software, or other computer executable code that is executed by a processor, controller, or other electronic control unit, such as a steering electronic control unit.

Additionally, while the present invention will be described with respect to an implement steering system for a front folding planter in which a series of hydraulic cylinders are used to control folding/unfolding and steering of the planter, it is understood that the invention may also be used to control various types of implement steering systems. Additionally, the invention may be used with towed device equipped with guidance systems, such as those that use GPS or similar navigation systems to auto-control movements of the towed device, such as described in U.S. Pub. No. 2005/0015189 and U.S. Pat. No. 7,147,241, the disclosures of which are incorporated herein.

Figure 1:
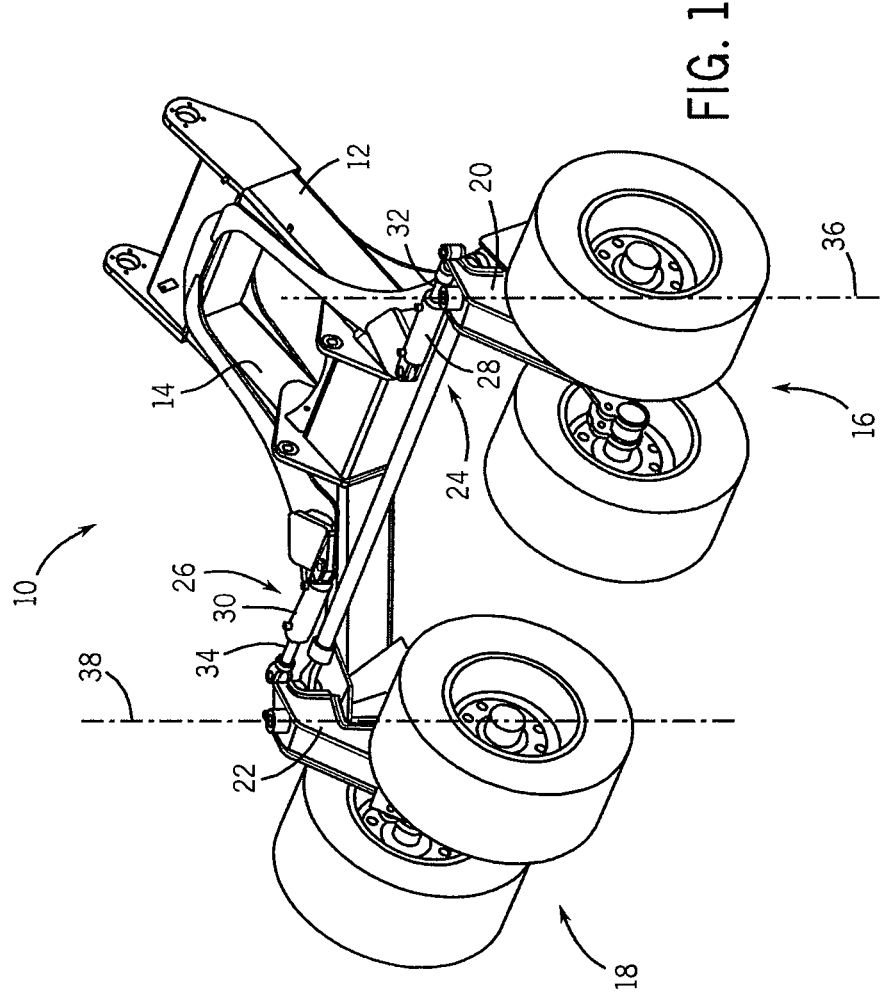
FIG. 1 is an isometric view of a carrier frame of an agricultural implement having an implement steering system according to one aspect of the invention.

Turning now to FIG. 1, a representative front folding planter has a carrier frame 10 that is centrally positioned between a pair of wing booms (not shown) and is used to support a central bulk fill hopper (not shown) as known in the art. The carrier frame 10 includes a pair of forward mounting arms 12, 14 for mounting the carrier frame 10 to a center frame tongue (not shown) or other structure for hitching the front folding planter to a tractor or other towing vehicle. The carrier frame 10 is supported by two pairs of wheels 16, 18 that are mounted to the carrier frame 10 in a conventional manner using wheel mounts 20, 22, respectively. The mounting arms 12, 14 also couple to the wheel mounts 20, 22, respectively.

The pairs of wheels 20, 22 are steerable by an implement steering system 50, as will be described more fully below. To facilitate this steering, steering cylinders 24, 26 include barrels 28, 30 that are connected to the carrier frame and rams 32, 34, respectively, that are connected to the wheel mounts 20, 22, respectively. The wheel mounts 20, 22 are pivotally coupled to the rams 32, 34 such that as the rams are extended and retracted, the respective wheels pairs 16, 18 turn about vertical axes 36, 38.

Figure 2:
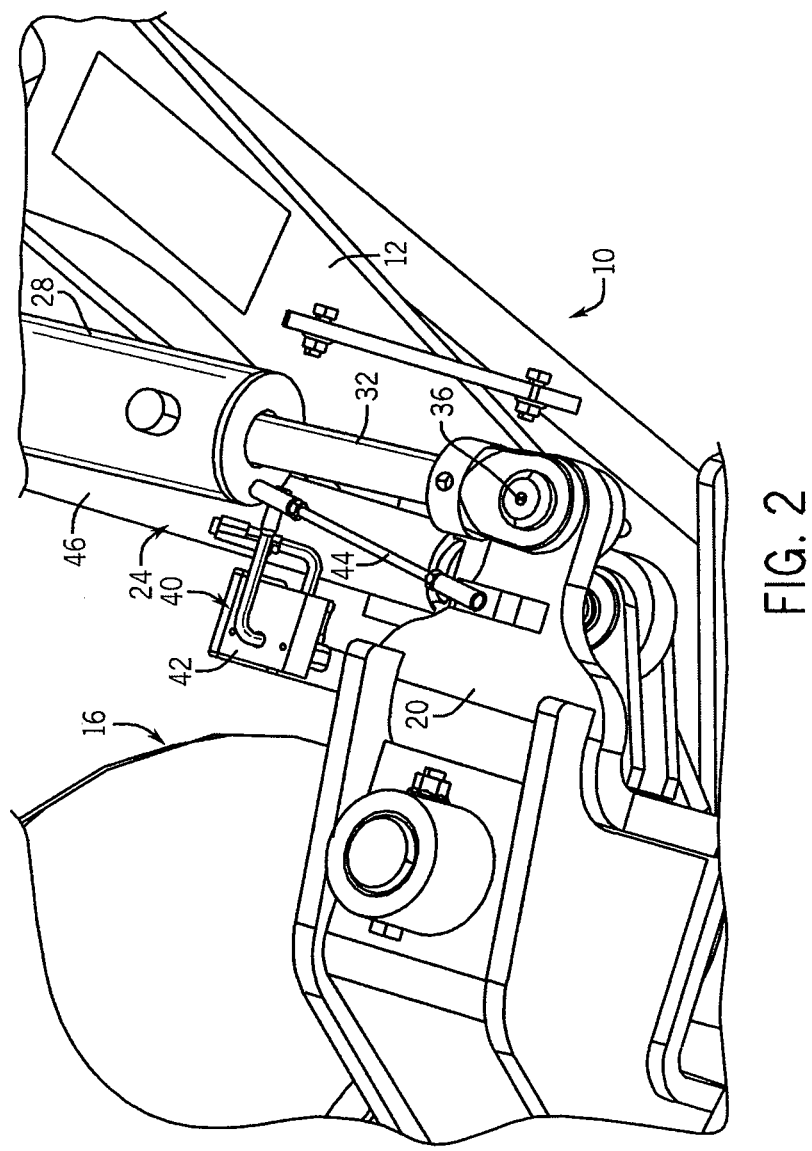
FIG. 2 is an enlarged top isometric view of a portion of the carrier frame shown in FIG. 1.

With additional reference now to FIG. 2, a carrier position sensor device 40 that provides feedback regarding the position of the carrier frame relative to a longitudinal traveling axis of the implement. The carrier position sensor device 40 includes a sensor 42 and a potentiometer 44 that is interconnected to the sensor 40 and the wheel mount 20. The sensor 42 is mounted to a fixed portion of the carrier frame, i.e., crossbar 46, and the potentiometer 44 is connected to the wheel mount 20. Thus, when the wheel mount 20 pivots, the angle of the potentiometer 44 relative to the sensor 40 will change, which allows the sensor 40 to measure the angle of the wheel mount 20 relative to the carrier frame 10.

Figure 3:
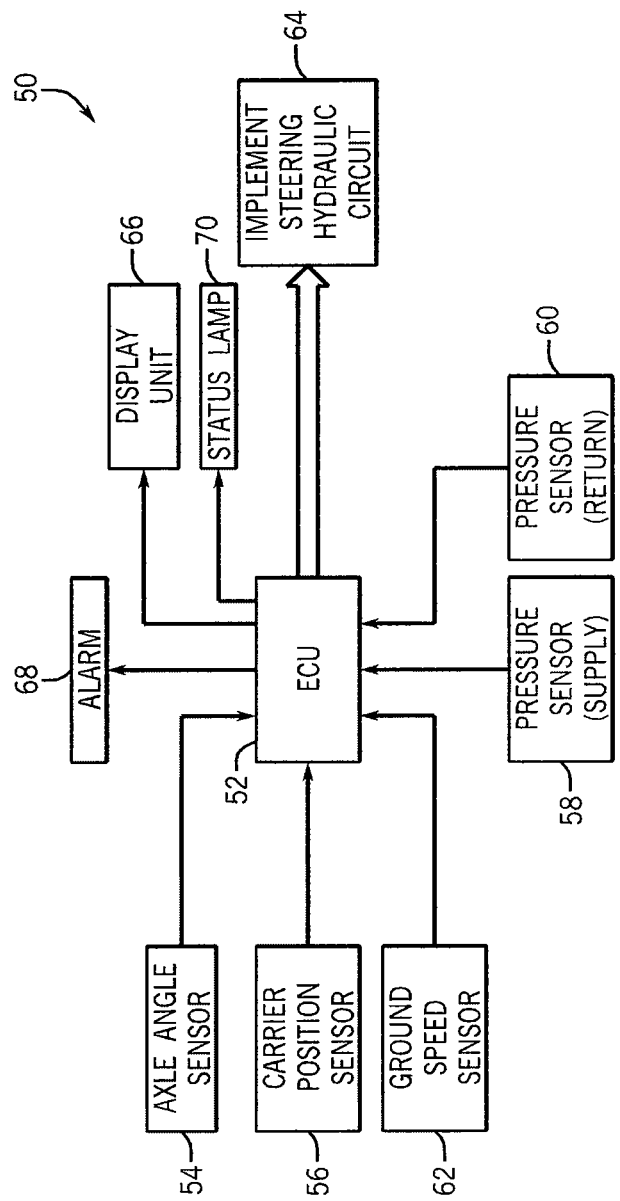
FIG. 3 is a schematic diagram of a control system for an implement steering system according to one aspect of the invention.

Turning now to FIG. 3, a general layout of a control system for an implement steering system according to one embodiment of the invention is shown. In general, the control system 50 includes a processing unit or "steering electronic control unit (ECU)" 52 that receives information from various sensors, such as position sensors 54, 56, e.g., carrier frame sensor device 40, pressure sensors 58, 60, and a ground speed sensor 62. It is also contemplated that some sensor input values may be received by the steering electronic control unit (ECU) via CAN bus communication with other on-board ECUs. To effectuate steering of the implement, the implement is equipped with a series of hydraulic cylinders. For purposes of description, the implement will be considered to have two steering cylinders—left and right steering cylinders. It should be noted that the implement may also have additional hydraulic cylinders such as those used to raise and lower the implement and fold and unfold the implement.

The pressure sensors 58, 60 measure the pressure in the supply and return hydraulic fluid lines that couple the hydraulic system of the implement to the hydraulic system of the towing vehicle. In this regard, in one embodiment, the hydraulics of the implement are run off the hydraulic system of the towing vehicle; however, it is contemplated that the implement could have an independent hydraulic system, i.e., hydraulic fluid source and pump(s). The ground speed sensor 62 may be mounted to measure the travel speed of the tractor or may be mounted to measure the travel speed of the implement. In one embodiment, the ground speed sensor 62 is the same sensor that is used to collect travel speed information that is displayed on a speedometer of the tractor. In an alternate embodiment, the ground speed sensor 62 is a separate sensor that measures the travel speed of the tractor. Alternatively, the ground speed sensor may also be an output from a GPS receiver. The position sensors 54, 56 are a steering axle sensor and a carrier position sensor, respectively. In this regard, position sensor 54 is mounted to the steerable axle of the implement and position sensor 56 measures the angle between the carrier 10, FIG. 1, and a center frame member (not shown) of the implement. Additionally, it is understood that other types of position sensors, such as GPS sensors, could be used to determine the relative positions of the steerable axle and the center frame.

As will be described in greater detail with respect to FIG. 4, the implement steering system 50 includes a hydraulic circuit 64. System 50 also includes a display unit 66 contained within the operator cab (not shown) of the implement on which messages regarding the status of the implement steering system can be displayed to an operator. Also, the display unit can incorporate an alarm to signal the operating status. Alternatively, an alarm 68 is also provided that can be sounded by the ECU 52 to signal the operating status of the implement steering system 10. The display unit 66 may incorporate a status indicator that is used to notify the operator of the current operating state of the implement steering system. Alternatively, the implement steering system 50 also includes a status indicator 70 that is caused to flash by the ECU when the implement steering system is active.

Figure 4:
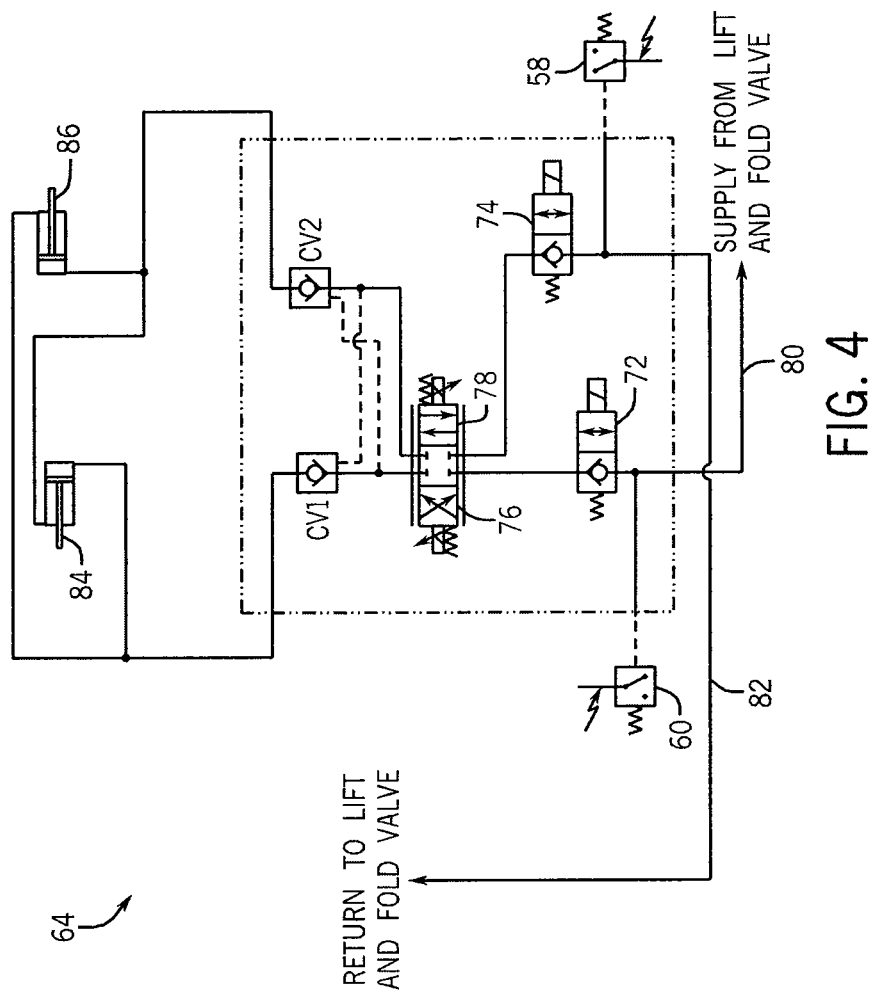
FIG. 4 is a schematic diagram of a hydraulic circuit for the implement steering system shown in FIG. 3.

Steering of the implement and, more particularly, a steerable axle of the implement is controlled by a hydraulic control circuit 64, which is schematically illustrated in FIG. 4. The hydraulic control circuit 64 has two solenoid valves 72, 74, and two proportional valves 76, and 78. Valves 72 and 74 are associated with supply and return lines 80 and 82, respectively. In this regard, when valve 72 is open, hydraulic fluid may flow in the supply line and when closed hydraulic fluid flow, including back flow, is prevented. In a similar manner, valve 74 when open allows hydraulic fluid to flow in the return line and when closed prevents the flow of hydraulic fluid in the return line. It will also be appreciated that the valves 72, 74 when closed prevent back flow of hydraulic fluid and therefore can be used to maintain pressure in the hydraulic circuit and also serves to isolate the steering circuit from the core implement hydraulics.

Valves 76, 78 are variable and control the flow of hydraulic fluid through cylinders 84, 86, respectively. Cylinders 84, 86, as will be described, are operable to effectuate left and right turns of the implements steerable axle. The solenoid valves are capable of receiving a variable electrical signal from the ECU 52. Each solenoid valve has an electromagnet (not shown) such that when an electrical signal is received, the electromagnet position that shifts the position of the valve proportionally to alter the flow of hydraulic fluid. In this regard, the valves 76, 78 provide signals, which in this case, take the form of a slug of hydraulic fluid, to their respective hydraulic cylinders to cause retraction or extension of the cylinders. As described with respect to FIGS. 1 and 2, each cylinder has a barrel and a rod (that are connected to the frame of the implement, and more particularly interconnected between a stationary component of the frame and a movable component of the frame, such as between the fixed frame of the implement and a steerable axle. Thus, when the hydraulic pressure in the barrel changes, the rod will extend or retract thereby causing a corresponding movement in the movable component to which the cylinder is connected. It will therefore be appreciated that the ECU 52 can, in response to feedback from the aforementioned sensors, control the flow of hydraulic fluid to the cylinders 84, 86 and thus electronically steer the implement. In one preferred embodiment, the hydraulic circuit 64 has check valves, CV1 and CV2, inline between the solenoid valves 76, 78 and cylinders 84, 86 to serve as a lock when implement steering is not activated.

Figure 5:
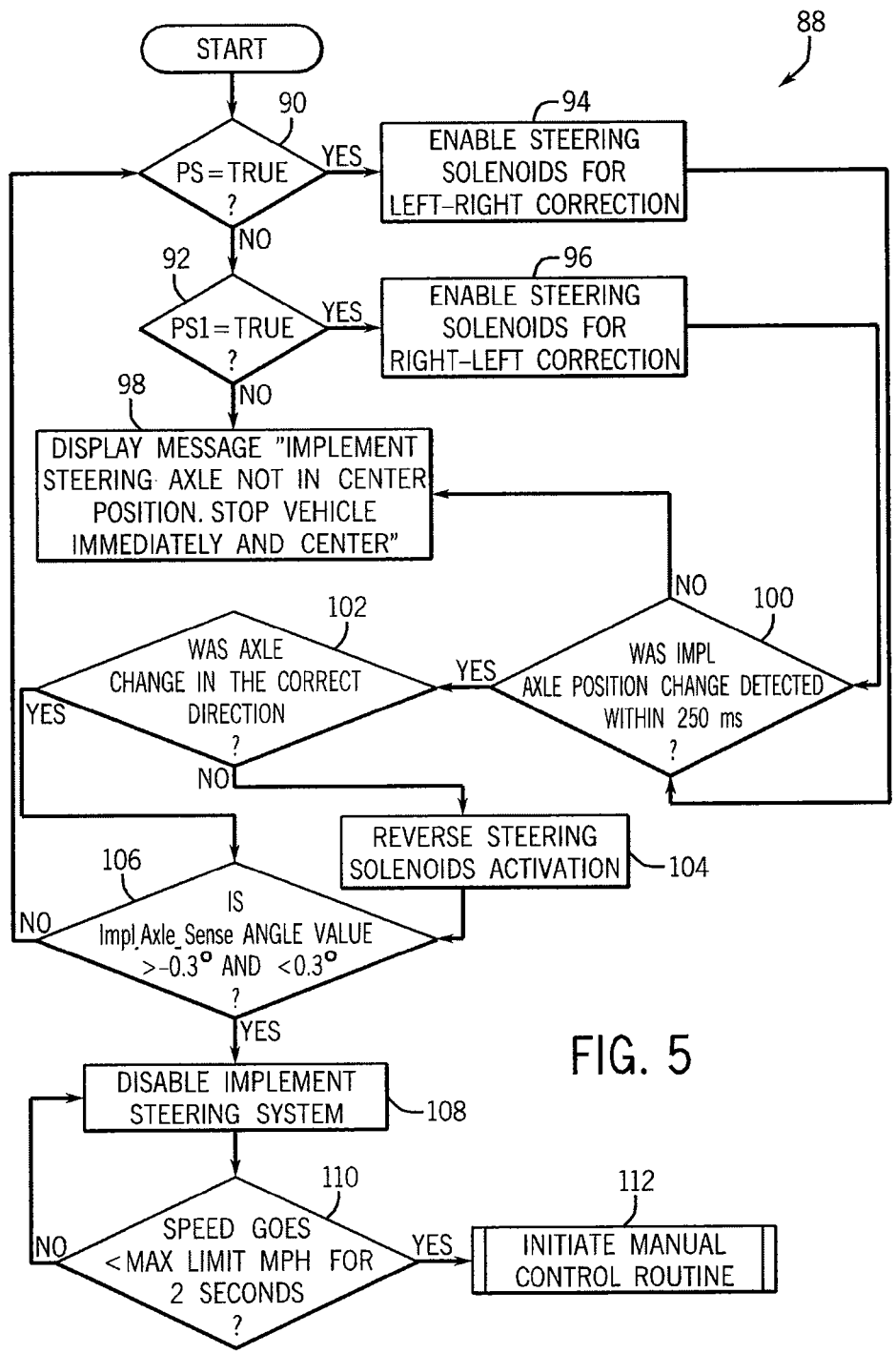
FIG. 5 is a flow chart setting for the steps of a process for auto-centering an implement as it is being towed in transport by a towing vehicle.

The ECU 52 is programmed to control the steering of the implement based on feedback received from the position, speed, and pressure sensors. In this regard, the invention provides a software-based control of the implement steering system. As will be described with respect to FIGS. 5, 6 and 7, the ECU 52 and display unit 66 executes various sets of executable code to operate the implement steering system according to one of three processes. One of these processes, which is illustrated in flow chart form in FIG. 5, is designed to automatically center the implement during transport. It will be appreciated that during transport the implement is in the folded position.

To initiate automatic steering correction of the implement during transport, process 88 causes the ECU to first determine the vehicle speed. If the vehicle speed has exceeded the prescribed limits and the implemented steering is not in the centered position, the automatic correction process initiates. Once initiated, the ECU 52 determines the states of the two pressure sensors 58, 60 at blocks 90 and 92. Pressure sensor 58 provides feedback to the ECU regarding the presence of pressure in the supply line at block 90 and pressure sensor 60 provides feedback to the ECU regarding the presence of pressure in the return line at block 92. If there is a non-trivial pressure in either the supply line or the return line, the ECU 12 activates solenoids 72 and 74 to allow hydraulic fluid flow to and from the hydraulic circuit 64 and similarly activates either steering solenoids 76 or 78 to enable steering of the implement at blocks 94 and 96. To make the operator aware that the implement steering system has been enabled, the ECU 12 and display unit flash a status icon (not shown) on the display screen.

On the other hand, if no pressure is measured in either the supply or return lines, the ECU 52 causes the display unit 66 to display a message indicating that the implement steering system has not been enabled at block 98. For example, the display unit 66 displays the message "IMPLEMENT STEERING AXLE NOT IN CENTER POSITION. STOP VEHICLE IMMEDIATELY AND CENTER." This message conveys to the operator that the automatic steering system is disabled and not capable of steering the implement. Accordingly, the operator must move the hydraulic remote control lever to an active position to pressurize the hydraulic system. Once pressure is detected at either pressure sensor 58 or pressure sensor 60, the ECU 52 will provide control signals to solenoids 72, 74, and 76 or 78.

Pressure sensor 58 senses pressure in the supply line and pressure sensor 60 senses pressure in the return line. In this regard, if pressure sensor 58 detects a non-trivial pressure in the supply line, the ECU 52 will activate solenoids 72 and 74 and further activate solenoid 78 to enable left turn corrections and active solenoid 76 to enable right turn corrections. On the other hand, if the pressure sensor 58 does not detect pressure in the supply line, but pressure sensor 60 detects pressure in the return line, then solenoids 72 and 74 are activated and solenoid 78 is activated to enable right turn corrections and solenoid 76 is activated to enable left turn corrections. It will thus be appreciated that whether the fluid pressure in the supply and return lines has a supply bias or a return bias will determine whether solenoids 76, 78 are used to enable left or right turn corrections.

With solenoids 76, 78, 72 and 74 activated or open, the ECU 52 then receives feedback from steering axle sensor 54 at block 100. If the ECU 52, from the feedback provided by the steering axle sensor 54, determines that a steering axle change has taken place within a prescribed time, e.g., 250 ms, after the solenoids have been activated, the ECU 52 then determines if the change in the steering axle was in the correction direction at block 102. That is, if a right turn correction was needed, was a right turn correction made, for example. It is appreciated that the correctional direction is determined by ECU 52 using the current sensor position relative to the target center position as determined via a prior manual center calibration. If the steering axle change was not in the correction direction, the ECU 52 reverses the activation of solenoids 76, 78 at block 104. In either instance, the ECU then determines from feedback from the steering axle sensor 54 if the steering axle angle is within a predefined range, e.g., $>-0.3°$ and $<+0.3°$, at block 106. If not, the process loops back to block 90. If so, however, the ECU 52 disables the implement steering system by deactivating the steering solenoids 72, 74, 76 and 78 at block 108. It is also appreciated that the ECU 52 and the display unit 66 provide notification to the operator that the implement steering system has been disabled.

The ECU 52 them compares feedback from the speed sensor 62 to a maximum speed limit for implement steering at block 110. If the actual ground speed of the implement, as measured by the ground speed sensor 62, or equivalent speed source, is less than the maximum speed limit, e.g., 14.5 kph, for a predefined time period, e.g., two seconds, the ECU 52 enables manual operation of the implement steering system in accordance with a manual control process, FIGS. 6A and 6B, steering system at block 112. If the speed does not remain below the maximum speed limit for the predefined limit, the process loops back to block 108. In this regard, if the implement is traveling above a safe implement steering speed limit, steering of the implement, either automatically or manually, will be prevented so no undesirable steering axle angle can occur.

Figure 6A:
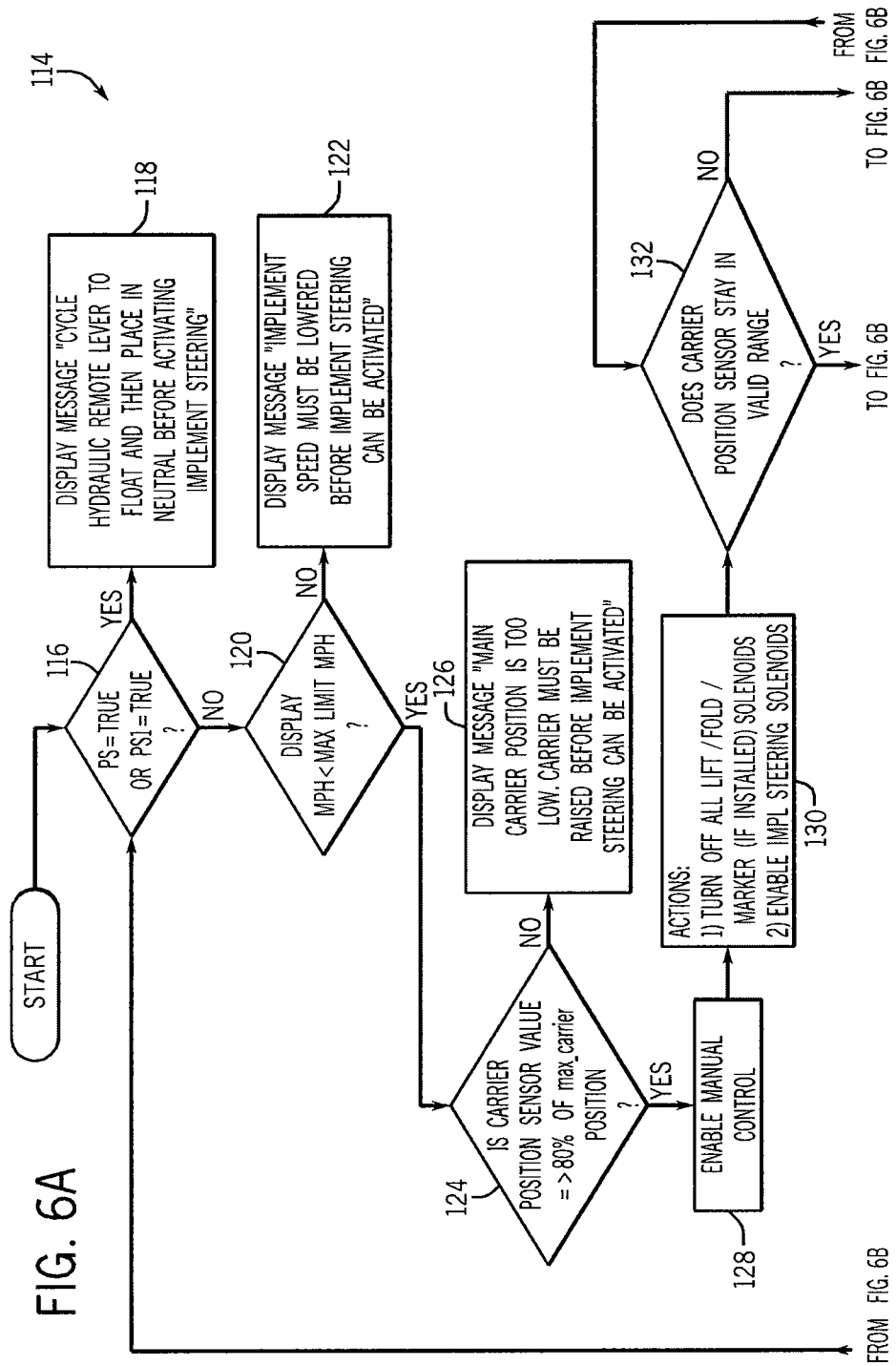
FIGS. 6A and 6B are flow charts setting for the steps of a process for disabling auto-centering of an implement and allowing manual centering of the implement based on a travel speed of the towing vehicle.
Figure 6B:
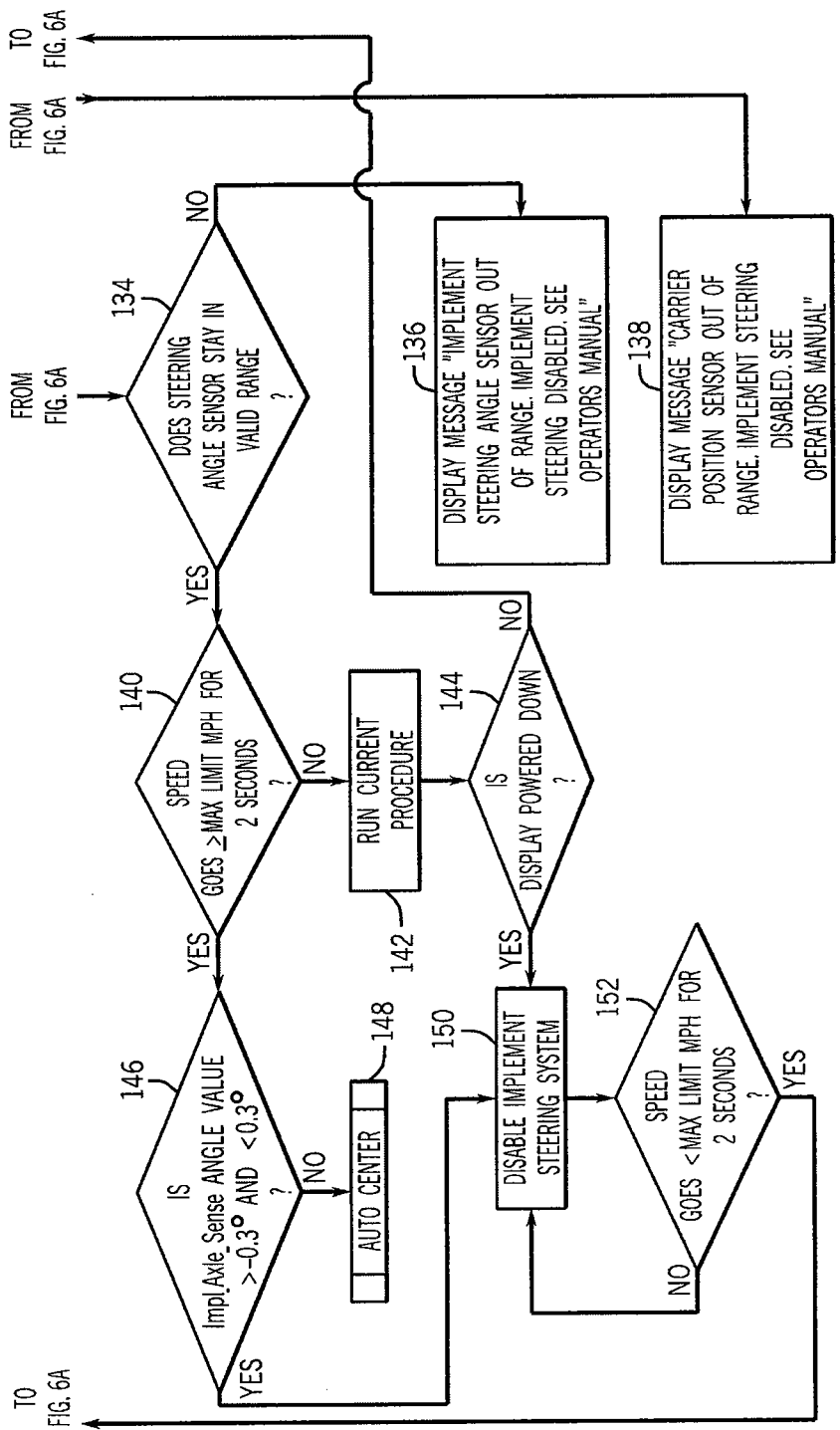

Referring now to FIGS. 6A and 6B, the manual control process 114 begins with receiving feedback from the pressure sensors to determine if there is pressure in either the supply line or the return line at block 116. If so, the steering solenoids remain disabled and a suitable message is displayed on the display unit at block 118. One exemplary message may be "CYCLE HYDRAULIC REMOTE LEVER TO FLOAT AND THEN PLACE IN NEUTRAL BEFORE ACTIVATING IMPLEMENT STEERING". If, on the other hand, the pressure sensors provide feedback indicating no pressure in the supply or return lines, the ECU 52 determines, from feedback provided by the ground speed sensor 62, or equivalent speed source, if the travel speed of the implement is less than the maximum speed limit, e.g., 14.5 kph, for steering the implement at block 120. If the maximum speed limit is being exceeded, the ECU 52 maintains the steering solenoids in the disabled state and causes the display unit to display a message that the speed of the implement is too fast for implement steering at block 122. If the speed is below the speed limit, the ECU 52, from feedback received from the carrier position sensor 56, determines if the carrier is at least eighty percent of a maximum carrier position at block 124. If not, the ECU 52 maintains the steering solenoids in their disabled state and causes the display unit to display a message that the carrier position is too low for implement steering at block 126. On the other hand, if the implement is sufficiently raised, the ECU enables manual control of the steering system at block 128, which includes disabling all lift/fold/marker solenoids (not shown) and enabling the steering solenoids 72, 74, and 78 at block 130. It should be noted that when manual control of the steering system is activated, solenoid 76 remains disabled.

With manual control of the implement steering system activated, the ECU 52 continues to receive feedback from the ground and position sensors. In this regard, the ECU 52 determines if the carrier position sensor is within a valid range at block 132. If so, the ECU 52 then determines if the steering angle sensor is within a valid range at block 134. If the carrier position sensor is outside the valid range, the process proceeds to block 136 whereupon the ECU 52 disables the steering solenoids effectively disabling implement steering and causes the display unit to display a corresponding message. Similarly, if the steering angle sensor is outside the valid range, the ECU 52 disables the steering solenoids and causes the display unit to display a corresponding message regarding the carrier position sensor being out of range at block 138.

If the steering angle sensor is operating properly, the process proceeds to block 140 whereupon the ECU 52 determines if the ground speed of the implement is greater than the ground speed limit for implement steering. If the ground speed is below the speed limit, the steering solenoids remain enabled at block 142 and the ECU 52 proceeds to block 144 to determine if the display has been powered down. If the speed limit has been exceeded for a predefined time period, e.g., two continuous seconds, the ECU 52 then determines if the angle of the steerable axle is outside a predefined range, e.g., >−0.3° and <0.3°, at block 146. If it is, the ECU 52 proceeds to execute the steps of an auto-centering process at block 148. If the angle is inside the range, however, implement steering is disabled at block 150. In this regard, manual steering of the implement is not allowed when the implement is traveling at higher speeds and the angle of the steerable axle is inside the aforementioned range. The ECU 52 then proceeds to block 152 and determines if the travel speed of the implement is less than the steering speed limit. If not, the process loops back to block 150. If the travel speed of the implement has dropped below the maximum speed limit, the ECU 52 returns to block 116 whereupon the manual control activation process begins and will automatically activate upon conditions beginning at block 116, thus eliminating the need for operator intervention. It will be appreciated that the auto-centering process can be carried out in a number of ways but generally includes pulsing the steering solenoids 76, 78 to extend or retract the steering cylinders until the misalignment if the implement with the towing vehicle is corrected.

The present invention also includes a method for controlling implement steering during planting. This method, which may also be embodied in computer executable code that can be executed by the ECU 52, is designed to provide automatic centering of the implement during planting and thereby provide drift correction as well as off center correction that may occur because of pressure leakage as the implement is towed along the planting surface. The process also provides automatic centering of the implement at headland turns.

Figure 7:
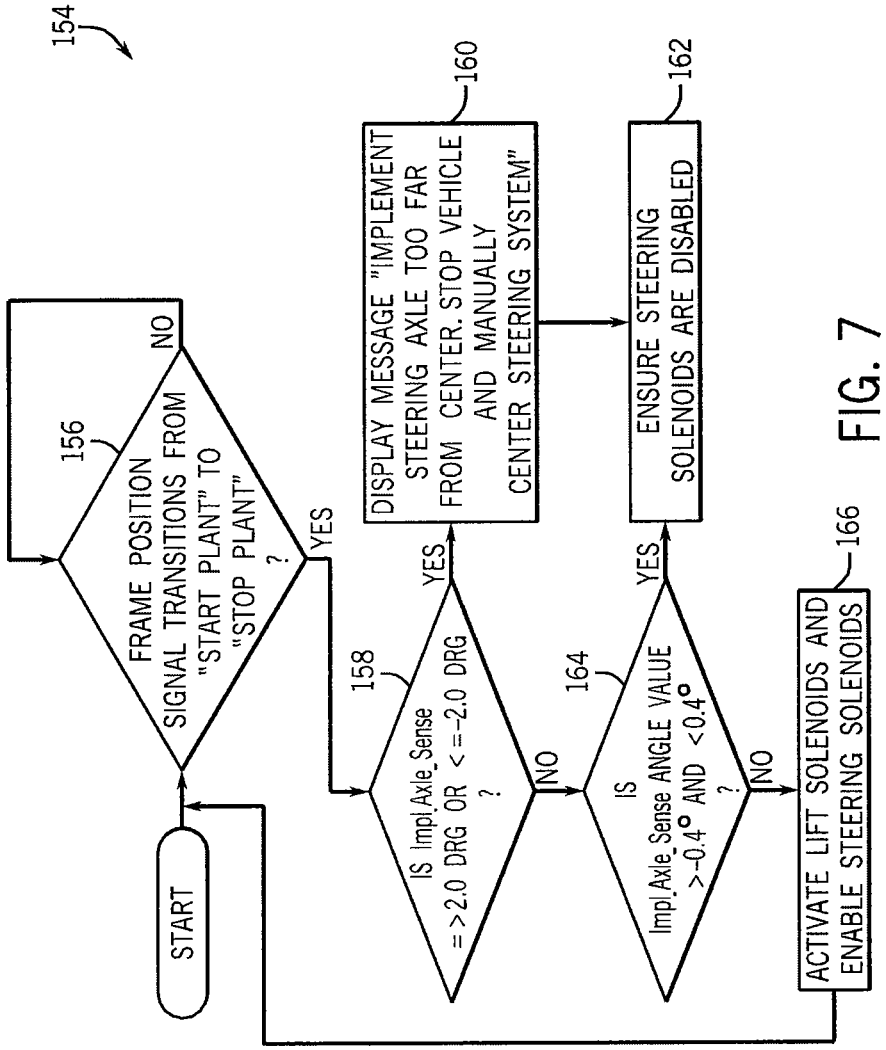
FIG. 7 is a flow chart setting for the steps of a process for automatically centering a towed implement during in-field use of the towed implement.

Turning now to FIG. 7, the automatic centering during planting process 154 begins at block 156 whereupon the ECU 52 determines if the frame control (not shown) is in the planting position. If the frame control is not in the planting position, the process loops back to block 156. However, if the frame has been lowered into the planting position, the ECU 52 proceeds to determine if the angle of the steerable axle is within a first predefined range; namely, <2.0° or >−2.0°, at block 158. If the angle is outside the range, the ECU 52 causes the display unit 66 to display a fault message that the implement is too far off center and disables the steering solenoids at block 160. Once the notification has been acknowledged, the ECU 52 advances to block 162 whereupon the ECU 52 takes no corrective action by ensuring that the steering solenoids remain disabled. If the angle of the steerable axle is within the first predefined range, the ECU 52 then determines if the steerable axle is outside a second predefined range, e.g., >−0.4° and <0.4°, at block 164. If so, the ECU 52 moves to block 162. If not, the ECU 52 enables the frame lift solenoids 166 and enables the steering solenoids so that the implement may be automatically centered at block 166. Specifically, solenoids 72, 74, and 78 are enabled for left turn correction and solenoids 72, 74, and 76 are enabled for right turn correction. With the solenoids activated to enable automatic centering of the implement, the display unit 66 status indicator is activated at block 166. In one preferred embodiment, the ECU 52 provides control signals to the steering solenoids such that a one-half degree change in steering axle position is made within a defined time period, i.e., 1000 milliseconds, until the angle of the axle is within the first predefined range. In this regard, after the steering system has been activated, the process returns to block 156.

It will therefore be appreciated that the present invention provides a process for controlling the steering of a steerable implement. The process, which can be embodied in computer executable code for execution by an electronic control unit, includes various sub-processes or routines that disable the implement steering system if the angle of the steerable axle is outside a predefined range or if the travel speed of the implement exceeds a predefined limit. The process allows manual control of the implement steering system under certain conditions but will also disable manual control is the implement is too far out of position or traveling at a speed in excess of a control limit.

Many changes and modifications could be made to the invention without departing from the spirit thereof. The scope of these changes will become apparent from the appended claims.

We claim:

1. A method for controlling movements of a farm implement that is coupled to a prime mover, the farm implement having a frame and an implement steering system, the method comprising:
   determining with a steering control unit if the frame is in a planting position and if the frame is in the planting position, the steering control unit conducting the additional steps of:
      monitoring an angle of a steerable axle of the farm implement relative to a path of travel of the prime mover;
      enabling the implement steering system to center the farm implement relative to the path of travel if the angle is within a first predetermined range having an upper limit and a lower limit and outside of a second predetermined range having an upper limit and a lower limit, an absolute value of the upper limit of the first predetermined range is greater than an absolute value of the upper limit of the second predetermined range and an absolute value of the lower limit of the first predetermined range is greater than an absolute value of the lower limit of the second predetermined range; and
      disabling the implement steering system if the angle is outside the first predetermined range; and
   determining with the steering control unit if the farm implement is in transport and if the farm implement is in transport, the steering control unit conducting the additional steps of
      monitoring an angle of a steerable axle of the farm implement relative to a path of travel of the prime mover;
      determining if the angle of the steerable axle lies within a predefined range; and
      enabling the implement steering system to center the farm implement relative to the path of travel if the angle is within the predefined range such that the farm implement substantially follows the path of travel of the prime mover and remains substantially centered relative to the prime mover as the prime mover is making a headland turn.

2. The method of claim 1 wherein the steps of enabling the implement steering system includes the step of enabling one or more frame lift solenoids configured to control the flow of hydraulic fluid to one or more lift cylinders.

3. The method of claim 2 further comprising disabling manual control of the implement steering system with the steering control unit if a ground speed of the farm implement exceeds a predefined speed limit.

4. The method of claim 2 further comprising enabling manual control of the implement steering system with the steering control unit only if the farm implement is in a minimally safe position.

5. The method of claim 1 further comprising first enabling the implement steering system with the steering control unit only if the implement steering system is pressurized.

6. The method of claim 5 further comprising providing an electronic message to an operator with the steering control unit that the implement is not in a center position if an angular position of the farm implement has changed within a predefined time period and if the farm implement is not in a correctable position.

7. The method of claim 6 wherein the predefined range of the angle is less than −0.3 degrees or greater than 0.3 degrees.

8. The method of claim 1 further comprising flashing a status indicator with the steering control unit when manual control of the implement steering system is enabled.

9. The method of claim 1 wherein implement steering is automatically activated to a predefined centered position upon raising the frame of the farm implement from the planting position.

10. An implement steering system for use with a towable implement having a frame, the implement movable between a working position and a transport position, the system comprising:
   a plurality of solenoid control valves configured to control fluid flow to a plurality of cylinders adapted to steer a steerable axle of the towable implement;
   a first position sensor that measures an angular position of the steerable axle; and
   an electronic control unit (ECU) configured to execute a set of instructions contained on computer readable medium that when executed causes the ECU to receive feedback from the first sensor and determine if the implement is in one of the working position and the transport position such that if the implement is in the working position, the ECU:
   activates the plurality of solenoid control valves so that fluid can flow to or from the plurality of cylinders to allow steering of the steerable axle if the angle is within a first predetermined range having an upper limit and a lower limit and outside of a second predetermined range having an upper limit and a lower limit, an absolute value of the upper limit of the first predetermined range is greater than an absolute value of the upper limit of the second predetermined range and an absolute value of the lower limit of the first predetermined range is greater than an absolute value of the lower limit of the second predetermined range; and
   electrically deactivates the plurality of solenoid control valves so that fluid cannot flow to or from the plurality of cylinders to prevent steering of the steerable axle if the angle is outside the first predetermined range; and
   such that if the implement is in the transport position, the ECU: electrically deactivates the plurality of solenoid control valves so that fluid cannot flow to or from the plurality of cylinders to prevent steering of the steerable axle if the angular position of the steerable axle is outside a predefined range.

11. The implement steering system of claim 10 wherein the ECU is configured to deactivate the plurality of solenoids if the steerable axle has an angular position greater than −0.3 degrees or less than 0.3 degrees.

12. The implement steering system of claim 10 further comprising a lamp and wherein the ECU is further caused to darken the lamp when the solenoids are deactivated.

13. The implement steering system of claim 10 further comprising a speed sensor and wherein the ECU is further caused to enable manual steering of the implement if the speed of the implement is below a speed threshold.

14. The implement steering system of claim 13 further comprising a carrier position sensor and wherein the ECU is further configured to enable manual steering of the implement if the carrier position sensor indicates that the implement is in a raised position.

15. A non-transitory, computer readable storage medium including a set of instructions in a computer readable format stored thereon that when executed by an electronic control unit (ECU) cause the ECU control operation of an implement steering system for an implement having a frame and being connected to a towing vehicle, by:
- electronically monitoring if the frame is in a planting position and if the frame is in the planting position, conducting the additional steps of:
  - monitoring an angle of a steerable axle of the implement relative to a path of travel of the towing vehicle;
  - enabling the implement steering system to center the implement relative to the path of travel if the angle is within a first predetermined range having an upper limit and a lower limit and outside of a second predetermined range having an upper limit and a lower limit, an absolute value of the upper limit of the first predetermined range is greater than an absolute value of the upper limit of the second predetermined range and an absolute value of the lower limit of the first predetermined range is greater than an absolute value of the lower limit of the second predetermined range; and
  - disabling the implement steering system if the angle is outside the first predetermined range;
- electronically monitoring a position of the implement as it is being transported by the towing vehicle with the implement steering system of the implement in an enabled state;
- providing control signals to at least one of a plurality of actuators to cause the at least one of the actuators to steer the implement automatically to bring the implement back in alignment with the towing vehicle if the implement is misaligned with the towing vehicle and if the misalignment is within an auto-correctable range; and, alternately,
- providing control signals to the plurality of actuators to disable the implement steering system if the implement is misaligned with the towing vehicle and the misalignment is outside an auto-correctable range.

16. The computer readable storage medium of claim 15 wherein the set of instructions further causes the ECU to determine a travel speed of the implement and if the travel speed is below a predefined speed limit, enable manual control of the implement steering system.

17. The computer readable storage medium of claim 16 wherein the set of instructions further cause the ECU to determine if the implement is in a raised position and only permit manual control of the implement steering system if the implement is in the raised position.

18. The computer readable storage medium of claim 17 wherein the set of instructions further causes the ECU to disable manual control of the implement steering system if the speed of the implement exceeds the predefined speed limit for a predefined period of time.

19. The computer readable storage medium of claim 15 wherein the set of instructions further causes the ECU to provide auto-centering control signals to at least one of the plurality of actuators if the implement is misaligned with the towing vehicle by greater than 0.3 degrees.

20. The computer readable storage medium of claim 15 wherein the set of instructions further causes the ECU to limit manual control of the implement steering system to instances when travel speed of the implement is below a predefined speed limit.

* * * * *